United States Patent [19]

Bolin et al.

[11] 4,382,098

[45] May 3, 1983

[54] SAUSAGE EMULSIONS CONTAINING GLUCONATE SALTS AND PROCESS OF PREPARATION

[75] Inventors: Hubert Bolin, Park Forest, Ill.; James N. Bacus, Gainesville, Fla.; Ronald O. Barhaug, Darien, Ill.

[73] Assignee: Swift & Company, Chicago, Ill.

[21] Appl. No.: 404,276

[22] Filed: Aug. 2, 1982

Related U.S. Application Data

[63] Continuation of Ser. No. 236,793, Feb. 23, 1981, abandoned.

[51] Int. Cl.³ .............................................. A23L 1/31
[52] U.S. Cl. .................................... 426/646; 426/649; 426/652; 426/654; 426/806
[58] Field of Search ............... 426/105, 129, 284, 324, 426/332, 646, 649, 650, 652, 654, 413, 415, 804, 806, 641, 648

[56] References Cited

U.S. PATENT DOCUMENTS

| | | | |
|---|---|---|---|
| 2,198,165 | 4/1940 | Hamburger | 426/648 X |
| 2,968,566 | 1/1961 | Munch | 426/650 X |
| 2,992,116 | 7/1961 | Sair | 426/646 X |
| 3,029,150 | 4/1962 | Bickel | 426/646 X |
| 3,032,421 | 5/1962 | Buchholz | 426/641 X |
| 3,051,579 | 8/1962 | Hammes | 426/652 X |
| 3,447,932 | 6/1969 | Olson et al. | 426/646 |
| 3,573,062 | 3/1971 | Paynter et al. | 426/646 |

Primary Examiner—Arthur L. Corbin
Attorney, Agent, or Firm—Charles E. Bouton

[57] ABSTRACT

The emulsifying and water binding properties of sausage, as well as the nutritional characteristics of sausage products, are improved by incorporating therein, as a partial replacement for sodium chloride, a salt system comprising calcium or sodium gluconate in combination with an alkaline phosphate.

10 Claims, No Drawings

SAUSAGE EMULSIONS CONTAINING GLUCONATE SALTS AND PROCESS OF PREPARATION

This is a continuation of application Ser. No. 06/236,793 filed Feb. 23, 1981, now abandoned.

This invention relates to improved meat products and to processes for the preparation thereof, and in particular, relates to improved sausage products and a method of preparing same.

The art of sausage making is an ancient craft encompassing a diversified range of products. Generally, sausages can be classified in two broad categories, (1) ground, fresh sausage products, and (2) emulsion-type sausages such as frankfurters, weiners, bologna, liver sausage and braunschweiger, i.e., processed sausage products. The present invention has application to the manufacture of emulsion-type sausage products (processed sausage). Whereas ground fresh sausages show discrete particles of meat, in emulsion-type sausages the fat is emulsified and stabilized by the lean meat components.

Sausage products are cured with nitrite and/or nitrate salts, and also contain various other additives such as water, spices, sugars and liquid smoke. In addition, sausage products will almost always contain salt (sodium chloride). Salt has at least three primary functions in the manufacture of sausage. Firstly, it dissolves in water to form a brine which acts to retard microbiological growth. Secondly, it contributes basic taste characteristics. Thirdly, it aids in solubilizing the myosin-type proteins of comminuted animal muscle so as to enable emulsification of the fat by the swollen protein. Potassium chloride is a recognized, albeit inferior, substitute for sodium chloride in sausage manufacture.

Processed foods in general have been criticized by some nutritionists who point to the presence of sodium chloride in such products as contributing to an excessive dietary intake of sodium, which might lead to hypertension in some individuals. Unfortunately, an adequate substitute for salt in the manufacture of sausage products has never been found. Phosphate salts, and in particular the highly soluble alkaline phosphates, can be used to partially replace sodium chloride to aid in the solubilization of myosin-type proteins in sausage emulsions. However, phosphate salts do not provide the basic flavor characteristics of sodium chloride. And more importantly, phosphate salts tend to exacerbate the unfavorable phosphorus to calcium balance inherent in meat. Accordingly, phosphate salts have been utilized in only a limited manner in the manufacture of sausage products.

Many organic and inorganic salts have been evaluated in attempts to partially replace sodium chloride in the manufacture of sausage products. Unfortunately, all proposed candidates either deleteriously affect flavor characteristics of the sausage or detract from the emulsifying characteristics of the sausage formulation such that the fat/water content is adversely reduced during cooking. It should be clear from the foregoing that there exists a real need in the art to develop a partial substitute for sodium chloride in the manufacture of sausage products. It is accordingly a primary objective of the present invention to provide a new salt system as a partial substitute for sodium chloride in processed sausage products.

It is also an important objective of the present invention to provide sausage products exhibiting improved emulsifying characteristics.

It is another objective of the present invention to provide sausage products having lower sodium chloride contents.

It is a further objective of the present invention to provide sausage products exhibiting improved calcium to phosphorus ratios.

It is an additional objective of this invention to provide an improved method for manufacturing sausage products having good emulsifying properties, lower levels of sodium chloride and improved calcium to phosphorus ratios.

Briefly, the objectives of this invention are obtained by using a combination salt system containing both a gluconate salt and an alkaline phosphate, as a partial replacement for sodium chloride in the manufacture of processed sausage products.

It is, of course, well-known to incorporate phosphate salts in meat products, usually in amounts of less than 0.5% by weight. Such phosphate salts have the primary function of increasing moisture retention by both raising pH, and by causing a swelling or unfolding of the muscle proteins, thereby making more sites available for water binding. Generally, only highly soluble alkaline phosphates, such as sodium tripolyphosphate and sodium pyrophosphate, are commercially utilized. Sodium tripolyphosphate and sodium pyrophosphate are also the two phosphate salts preferably utilized in the present invention, either alone or in combination.

Calcium gluconate, $(C_5H_{11}O_5COO)_2$ $Ca.H_2O$, and sodium gluconate $(C_5H_{11}O_5COO\ Na.H_2O)$ are the calcium and sodium salts of gluconic acid, and are white, odorless powders. Applicants have surprisingly discovered that unlike almost every other candidate salt, calcium gluconate and sodium gluconate aid in swelling and unfolding the myosin protein in sausage emulsions, thus enhancing emulsification and water retention. Moreover, neither of these gluconate salts imparts deleterious flavor characteristics to the final product, when used in small quantities.

Candidate salts which were evaluated and found not to acceptably impart emulsifying and water-retention properties to sausage emulsions include sodium orthophosphate, glycerin, calcium chloride, magnesium chloride, aluminum chloride, zinc chloride, ferric chloride, sodium sulphate, sodium nitrite, sodium nitrate, sodium lactate and calcium lactate. Sodium acetate appeared to function reasonably well in imparting emulsification properties, but imparted a deleterious flavor note. See Example I.

The combination of gluconate salt and alkaline phosphate salt enables replacement of any portion of the normal salt content of the sausage product, usually from 1–5% by weight, without sacrificing flavor characteristics or emulsifying and water-retention properties. Generally, the gluconate salt/alkaline phosphate combination will be used to replace about 10–50% of the normal sodium chloride content of a given processed sausage product. Thus, assuming a normal sodium chloride content of 1–5%, the gluconate/phosphate combination system should comprise from 0.1 to 2.5% by weight of the final sausage emulsion product, and most preferably from 0.1 to 1.0% by weight. Use of the gluconate/phosphate combination enables a decreased sodium chloride content in the final sausage product. Moreover, when calcium gluconate is utilized, one derives the additional benefit of improving the calcium to phosphorous ratio in the final product. Nutritionists indicate this ratio, ideally, should fall within the range of 2:1–1:2. By adding equimolar amounts of calcium gluconate and alkaline phosphate, the inherent calcium to phosphorous ratio of the meat ingredients can be maintained.

The other raw material ingredients used in manufacturing the present sausage products are standard in the art. Thus, meat ingredients are selected in accordance with well-known sausage manufacturing techniques so as to provide appropriate amounts of protein, fat, and moisture. Moreover, the meat ingredients are selected so as to provide suitable water binding properties, a characteristic referring to meats' ability to retain moisture during thermal processing of the product. Meats considered to have good binding properties are skeletal tissue from beef animals, such as bull meat, shank meat, chucks and boneless cow meat. Intermediate value binder meats include head meat, cheek meat and lean pork trimmings. Low binding value meats usually contain large proportions of fat or are non-skeletal muscle, including regular pork trimmings, jowls, ham fat, beef briskets, hearts and tongue trimmings.

As is well-known in the art, these meat ingredients are ground and/or chopped and/or emulsified, along with various other additives including ice/water, curing ingredients, spices, and other optional ingredients. Moisture, added as ice at the time of chopping, is important not only to provide suitable moisture to the final product, but also is necessary to hold product temperatures below that which would produce instability in the emulsion while it is being chopped.

The curing salts include sodium or potassium nitrate and/or nitrite. These ingredients are added so that no more than 200 ppm sodium nitrite will be present in the finished sausage product. Nitrite used at the level of ¼ oz. per 100-lbs. will result in 156 ppm nitrite being added to the product. The nitrite, in combination with moisture level, pH, added salt, and final internal processing temperature, has a general bacteriostatic effect in the finished sausage product. Also, the nitrite produces a flavor and color that has become characteristic in sausage products.

Spices are important contributors to sausage flavor, and in some instances provide bacteriostatic and antioxidant properties. Either natural spices or the oils and oleoresins extracted therefrom may be used for flavoring sausage products. Usually, oils and oleoresins are solvent-extracted, and transferred to a salt or sugar base. Typical spices used in various sausage products include black pepper, allspice, basil, bay leaf, cardamom, cloves, ginger, mace, nutmeg, mustard, paprika, pimento, cayenne pepper, white pepper, caraway, coriander, celery seed, cumin, marjoram, thyme, savory, sage, anise, cinnamon, capsicum, onion, garlic, sesame, and fennel.

In addition to ice/water, curing salts and spices, sausage formulations may optionally contain ascorbates-/erythorbates, sugars, phosphates, acid/liquid smoke and binders/extenders. The salts of ascorbic acid and erythorbic acid are active reducing agents that react with nitrite in such a way as to insure development of the desired color in cured sausage products. Sugars are generally incorporated in sausage products as a curing ingredient and/or adjunct to provide flavor or mask the salt flavor. A variety of sugars, such as sucrose, dextrose, corn syrup, solids and sugar derivatives such as sorbitol, may be used. Sugars are generally employed at levels of from 8 oz. to 2-lbs per 100-lbs. of meat.

Food grade acids are commonly used in the manufacture of sausage products to spray product surfaces prior to smoking or cooking. The acid reduces surface pH and promotes coagulation of protein at the surface. Acetic acid or vinegar is used extensively. Liquid smoke, when sprayed, dipped, or atomized onto sausage surfaces, imparts flavor, improves color, and aids peeling in some instances.

Various binders/extenders are added to sausage meat formulations to improve emulsion stability, to improve cooking yields, to improve slicing characteristics, to improve flavor, and to reduce formulation costs. Binders/extenders, when utilized, are added in amounts up to 3.5%. Typical binders/extenders include cereal, starch, vegetable flour, soy flour, soy protein concentrate, nonfat dry milk, and calcium-reduced nonfat dry milk.

Finally, as has been previously discussed, sausage formulations contain salt (sodium chloride), and sometimes alkaline phosphates. Depending on the type of sausage product, salt may be present in an amount of from 1–5%, basis the final product weight. Of course, in accordance with the present invention, from 10–50% of this normal sodium chloride content will be replaced with the gluconate salt/alkaline phosphate combination.

As is well-known in the art, once all the ingredients have been ground and/or chopped, mixed, and emulsified, the resulting sausage dough may be transferred to stuffers for extruding the dough mix into casings. After the emulsion is stuffed in the casings, the encased mass may be tied with thread or fastened with metal clips. The stuffed and linked sausage products may then be transferred to a smoke house wherein the sausage products undergo a specialized drying and cooking operation in which the sausage emulsion is coagulated. After smoking and cooking, the product is showered with cold water and then chilled by refrigeration. Finally, after properly chilling the product, usually to a temperature of 35° F.–40° F., casings may be removed by a peeling operation.

The invention will be described further in connection with the examples set forth below which are for purposes of illustration only. All percentages are by weight unless otherwise indicated.

EXAMPLE I

In order to evaluate the emulsification/water retention efficacy of various salt systems, protein solubility tests were conducted for various salts in a standard meat emulsion system. Meat slurries were prepared by grinding/chopping lean meat (2% fat) with distilled water-/ice to a 1/16th inch particle size. Grinding/chopping was carried out in the presence of 3.7% by weight sodium chloride plus various candidate salts in amounts calculated to provide the equivalent ionic strength of 0.5% sodium chloride. The emulsion was then held at a pH of 6.5 and a temperature of 40° F. for a period of two hours. Thereafter, the slurries were centrifuged, and the liquid supernate and solid residue were analyzed. Results were as follows:

| Salt | Residue (grams) | Supernate (grams) | Protein in Supernate (%) |
|---|---|---|---|
| Potassium Chloride | 230.5 | 369.5 | 34.1 |

-continued

| Salt | Residue (grams) | Supernate (grams) | Protein in Supernate (%) |
|---|---|---|---|
| Sodium Orthophosphate | 231.2 | 368.8 | 23.6 |
| Sodium Pyrophosphate | 223.9 | 376.1 | 32.8 |
| Sodium Metaphosphate | 217.0 | 383.0 | 32.3 |
| Glycerine | 226.8 | 373.2 | 19.7 |
| Calcium Chloride | 220.4 | 379.6 | 24.9 |
| Magnesium Chloride | 230.9 | 369.1 | 22.7 |
| Aluminum Chloride | 187.6 | 412.4 | 12.7 |
| Zinc Chloride | 155.7 | 444.3 | 13.5 |
| Ferric Chloride | 205.3 | 394.7 | 8.7 |
| Sodium Acetate | 235.6 | 364.4 | 27.5 |
| Sodium Sulfate | 240.3 | 359.7 | 21.4 |
| Sodium Nitrite | 234.8 | 365.2 | 25.3 |
| Sodium Nitrate | 241.8 | 358.2 | 24.9 |
| Sodium Lactate | 214.9 | 385.1 | 12.7 |
| Calcium Lactate | 195.4 | 404.6 | 17.0 |
| Sodium Gluconate | 232.2 | 367.8 | 34.9 |
| Calcium Gluconate | 230.9 | 369.1 | 38.4 |

In general, greater protein solubility, and therefore presumably better emulsification properties, are indicated by higher residue weight, lower supernate weight and higher percent protein in supernate. Since it is known that phosphates improve emulsification properties in processed meats, it was not surprising to find that the sodium phosphates tended to score well. However, the excellent emulsification performances exhibited by sodium gluconate and calcium gluconate were quite surprising.

EXAMPLE II

Standard frankfurter emulsions were formulated to contain 35% fat and 10% protein, along with about 50% water. The formulas were prepared using standard ingredients including beef chucks, regular pork trimmings, beef flanks, ice, dextrose, corn syrup, seasoning mix, sodium erythorbate, sodium nitrite and liquid smoke. Also added to the emulsion was 0.135% of either sodium pyrophosphate or sodium tripolyphosphate or sodium acid pyrophosphate, along with an equimolar amount of calcium gluconate. The phosphate/gluconate system served to partially replace the sodium chloride. The emulsion was ground to 1/16th inch particle size, and was then held at 40° F. for two hours at a pH of 6.5. Thereafter, emulsion stability was evaluated by the Rongey emulsion test, which quantitates water and fat loss during heating and cooking at 160° F. Results were as follows:

| Emulsion System | % Moisture Loss | % Fat Loss | Total % Loss |
|---|---|---|---|
| Control | 13.2 | 4.8 | 18.0 |
| Sodium Pyrophosphate plus Calcium Gluconate | 8.9 | 2.8 | 11.7 |
| Sodium Tripolyphosphate plus Calcium Gluconate | 10.0 | 3.0 | 13.0 |
| Sodium Acid Pyrophosphate plus Calcium Gluconate | 13.3 | 4.1 | 17.4 |

Sodium pyrophosphate or sodium tripolyphosphate, added in combination with calcium gluconate, evidenced the most significant improvement in the emulsification properties. A slight improvement was observed with the addition of sodium acid pyrophosphate in combination with calcium gluconate. These results indicate that the emulsifying properties of sausage products, such as frankfurters, can be improved while lowering the sodium level, while at least maintaining an equivalent calcium to phosphorus ratio.

EXAMPLE III

A sensory evaluation of premium frankfurters (30% fat), where sodium chloride had been partially replaced by either calcium gluconate or a combination of calcium gluconate and sodium pyrophosphate, was conducted to indicate if these additives resulted in significant flavor differences. A control frankfurter was prepared containing 2.16% added sodium chloride by weight in the emulsion. A second frankfurter emulsion was prepared containing 1.9% sodium chloride and 0.64% calcium gluconate. A third frankfurter emulsion was prepared containing 1.9% sodium chloride, 0.2% sodium pyrophosphate and 0.34% calcium gluconate. Six trained panelists evaluated the three products, and concluded that flavor differences existing between control and test variations were minimal.

While this invention has been described and illustrated by reference to specific embodiments, there is no intent to limit the spirit or scope of this invention to the precise details set forth, except as may be defined in the following claims.

We claim:

1. A processed sausage product containing sodium chloride in which the normal sodium chloride content has been reduced by the addition of from 0.1 to 2.5%, based upon the weight of the final sausage product, of a salt system consisting of calcium or sodium gluconate in combination with an alkaline phosphate.

2. The processed sausage product of claim 1 wherein the alkaline phosphate is selected from the group consisting of sodium tripolyphosphate, sodium acid pyrophosphate, sodium pyrophosphate and mixtures thereof.

3. The processed sausage product of claim 2 wherein the salt system comprises from 0.1 to 1.0% of the final product.

4. The processed sausage product of claim 3 wherein the gluconate salt is calcium gluconate.

5. The processed sausage product of claim 4 wherein the gluconate salt and the alkaline phosphate are present in approximately equimolar amounts.

6. A method of manufacturing processed sausage products comprising substituting, for only a portion of the normal sodium chloride content, 0.1 to 2.5%, based upon the weight of the final product, of a salt system consisting of calcium or sodium gluconate in combination with an alkaline phosphate.

7. The method of claim 6 wherein the alkaline phosphate is selected from the group consisting of sodium tripolyphosphate, sodium acid pyrophosphate, sodium pyrophosphate and mixtures thereof.

8. The method of claim 7 wherein the salt system comprises from 0.1 to 1.0% by weight of the final sausage product.

9. The method of claim 8 wherein the gluconate salt is calcium gluconate.

10. The method of claim 9 wherein the gluconate salt and the alkaline phosphate are present in approximately equimolar amounts.

* * * * *